United States Patent
Ostrander et al.

(10) Patent No.: US 7,390,454 B2
(45) Date of Patent: Jun. 24, 2008

(54) THERMOFORMING PROCESS FOR PRODUCING CLASS "A" FINISH, HIGH GLOSS AUTOMOTIVE EXTERIOR PARTS

(75) Inventors: Catherine A. Ostrander, Grand Blanc, MI (US); Steven J. Schmidt, Holly, MI (US); Charles Calvin Mentzer, Jr., Beverly Hills, MI (US); Michael A. Szymberski, Sterling Hts., MI (US); Charles K. Buehler, Warren, MI (US)

(73) Assignee: General Motors Corporation, Detroit, MI (US)

( * ) Notice: Subject to any disclaimer, the term of this patent is extended or adjusted under 35 U.S.C. 154(b) by 861 days.

(21) Appl. No.: 10/921,514

(22) Filed: Aug. 19, 2004

(65) Prior Publication Data

US 2006/0038325 A1     Feb. 23, 2006

(51) Int. Cl.
*B29C 35/16* (2006.01)
(52) U.S. Cl. .................. 264/554; 264/132; 264/544
(58) Field of Classification Search ................. 264/554, 264/544, 132
See application file for complete search history.

(56) References Cited

U.S. PATENT DOCUMENTS

| | | |
|---|---|---|
| 4,769,100 A | 9/1988 | Short et al. |
| 4,868,030 A | 9/1989 | Mentzer et al. |
| 4,976,896 A | 12/1990 | Short et al. |
| 5,620,715 A | 4/1997 | Hart et al. |
| 5,750,234 A | 5/1998 | Johnson et al. |
| 6,103,328 A | 8/2000 | Niazy |
| 6,450,793 B1 | 9/2002 | DeNichilo |
| 6,579,397 B1 | 6/2003 | Spain et al. |
| 6,709,734 B2 | 3/2004 | Higashi et al. |
| 2004/0076846 A1 | 4/2004 | Domine et al. |

FOREIGN PATENT DOCUMENTS

| | | | |
|---|---|---|---|
| DE | 2708901 A1 | | 9/1977 |
| DE | 4023878 A | * | 1/1992 |
| DE | 4328963 A1 | * | 3/1995 |
| DE | 19708716 A1 | * | 9/1998 |
| JP | 2001293773 A | | 10/2001 |

OTHER PUBLICATIONS

"Self-nucleation and enhanced nucleation of polyvinylidene fluoride (α-phase)", by S. Schneider, X. Drujon, B. Lotz and J.C. Wittmann, Polymer vol. 42 pp. 8787-8798, (2001).

(Continued)

*Primary Examiner*—Jeff H Aftergut

(57) ABSTRACT

A thermoforming methodology for laminated thermoplastic sheets which preserves the class "A" finish and high gloss thereof. A thermoformer has a vacuum box component which includes a mold, and a pressure box component which is selectively sealable in relation to the vacuum box component. A heated laminated thermoplastic sheet is placed in the thermoformer, the class "A" side thereof facing away from the mold, and the thermoformer sealed. Vacuum is applied to the vacuum box component and simultaneously air pressure is applied to the pressure box component, including application of chilled compressed air, resulting in forming of the sheet on the mold and controlled cooling of the sheet which preserves its class "A" finish and high gloss.

15 Claims, 5 Drawing Sheets

OTHER PUBLICATIONS

"Impact of nucleating agents of PVDF on the crystallization of PVDF/PMMA blends", by S. Schneider, X. Drujon, J.C. Wittmann and B Lotz, Polymer, vol. 42, pp. 8799-8806, (2001).

"Influence of Additiveson the Crystallization Kinetics of Semicrystalline Polymers", by I. Pillin, S. Pimbert and G. Levesque, Polymer Engineering and Science, vol. 42, No. 11, pp. 2193-2201, (Nov. 2002).

"Crystallization and Morphology of Melt-Solidified Poly(vinylidene Fluoride)", by A.J. Lovinger, J. of Polymer Science, vol. 18, pp. 793-809, (1980).

* cited by examiner

THERMOFORMING PROCESS FOR PRODUCING CLASS "A" FINISH, HIGH GLOSS AUTOMOTIVE EXTERIOR PARTS

TECHNICAL FIELD

The present invention generally relates to methods of thermoforming a laminated thermoplastic sheet, wherein the sheet is capable of achieving a class "A" automotive finish. More particularly, the present invention relates to a thermoforming method which consistently achieves a class "A" finish of a laminated thermoplastic sheet.

BACKGROUND OF THE INVENTION

Automobile fascias, body side moldings (BSM), rockers, etc., are typically produced by an injection molding process followed by painting. The last steps of the painting process require that the painted part be baked for about 30 minutes at, for example, 250 degrees F. This production procedure is proven and functions well. However, there are a number of negatives associated with this process, including: a high scrap rate due to paint defects, expensive tooling costs, burdensome provisions for protection against possible mutilation in handling, and poor stone impact performance in sensitive areas of a motor vehicle (ie., under highway driving conditions, stones kicked up by other motor vehicles striking certain prone areas of the painted part).

Presently, however, new technologies are developing with the intention of eliminating the high cost of fabricating injection molding tools, and producing parts through the aforementioned injection molding and painting process. These technologies involve, as can be understood by reference to FIG. 1, a laminated thermoplastic sheet 10 which is formed in a thermoforming process. The laminated thermoplastic sheet 10 is composed, for example, of a paint film 12, which may optionally include a paint layer 12a and a clear coat 12b, wherein the color, finish and gloss of the class "A" side of the laminated thermoplastic sheet is matched to that of the paint of the motor vehicle to which the laminated thermoplastic sheet is to be used. A removable mask 12c is provided to protect the paint film 12 is removed when the part 20 is completed. The paint film 12 is bonded onto one side of a thermoformable thermoplastic substrate 18, via an adhesive layer 16, wherein the substrate may be, for nonlimiting example, thermoplastic polyurethanes, polyesters, vinyl copolymers, polyvinylchlorides, thermoplastic olefin (TPO), ABS, polyethylene, and blends, copolymers and/or alloys thereof.

Examples of laminated thermoplastic sheets 10 and methods of forming laminated thermoplastic sheets into formed parts 20 are described in U.S. Pat. No. 4,976,896 issued on Dec. 11, 1990 to the assignee hereof, U.S. Pat. No. 4,769,100 issued on Sep. 6, 1988 to the assignee hereof, and U.S. Pat. No. 4,868,030, issued on Sep. 19, 1989 to the assignee hereof; the disclosures of each of said U.S. Pat. Nos. 4,976,896, 4,769,100 and 4,868,030 being hereby herein incorporated by reference. Other U.S. patent references describe additional aspects of laminated thermoplastic sheets and the thermoforming processes therefor, as for example U.S. Pat. Nos. 6,450,793 and 6,709,734 and U.S. Patent Application Publication 2004/0076846.

While the technology for thermoforming laminated thermoplastic sheets has become well established, there yet remains the problem that the thermoforming process adversely affects the gloss of the class "A" finish. For example, the gloss of the class "A" finish may start at a gloss value above 70 but, as a result of thermoforming, the gloss value becomes unacceptably less than 70. Accordingly, in the prior art of thermoforming of laminated thermoplastic sheets, parts have inconsistent finish and gloss, resulting in scrap and/or parts having a finish and/or gloss which does not well match the finish and/or gloss of the paint of conventionally painted surfaces of the motor vehicle.

Accordingly, what is needed in the art of thermoforming laminated thermoplastic sheets, is some methodology associated with the thermoforming process which preserves, reliably under high volume production conditions, the class "A" finish of the laminated thermoplastic sheet which well matches the finish of conventionally painted surfaces of a motor vehicle, and retains a gloss value, after thermoforming, of above 70.

SUMMARY OF THE INVENTION

The present invention is a thermoforming methodology for laminated thermoplastic sheets which preserves, reliably under high volume production conditions, the class "A" finish of the laminated thermoplastic sheet which well matches the finish and gloss of conventionally painted surfaces of a motor vehicle, wherein the sheet retains a gloss value, after thermoforming, of above 70.

The thermoforming process according to the present invention utilizes a thermoforming apparatus including one or more heating stations and a thermoformer. The thermoformer has two mutually separable components: a vacuum box component which includes a mold, and a pressure box component in which chilled, pressurized air is introduced in order to thereby control cooling of the laminated thermoplastic sheet, which controlled cooling results in preservation of the class "A" finish and gloss value above 70.

A laminated thermoplastic sheet, as for example of the type described hereinabove, is loaded, in a conventional manner, onto a frame at a first station of a thermoformer apparatus.

Thereafter, the frame containing the laminated thermoplastic sheet is moved to a heating station, wherein preferably both the class "A" side of the sheet and the opposite class "B" side of the sheet are each heated by respective heater banks. The heater station heats the laminated thermoplastic sheet into a moldably softened state. Optionally, a pre-heat station may be provided.

Next, the laminated thermoplastic sheet is moved into position in the thermoformer, wherein the vacuum box and pressure box components are presently separated from each other, wherein of the laminated thermoplastic sheet is disposed between the vacuum box and pressure box components, and wherein the class "A" side of the sheet faces toward the pressure box component and the class "B" side of the sheet faces toward the mold of the vacuum box component.

Now, the vacuum box and pressure box components are mutually closed together, whereby the perimeter surfaces thereof mutually engage to provide an air-tight seal therebetween.

Once the perimeters of the vacuum box and pressure box components mutually seal, a cooling line in the mold is activated, and a vacuum (by "vacuum" is meant air pressure below atmospheric pressure) is applied to the vacuum box side of the laminated thermoplastic sheet, causing the class "B" side of the sheet to be sucked formingly onto the surface of the mold, and simultaneously compressed air (by "compressed air" is meant air under pressurization above atmospheric pressure) is forced into the pressure box component at the class "A" side of the laminated thermoplastic sheet, causing the sheet to be pressed formingly onto the surface of the mold.

As soon as the laminated thermoplastic sheet has formed onto the surface of the mold, the compressed air is vented as chilled compressed air (by "chilled compressed air" is meant compressed air at a temperature below substantially 70 degrees F.) is continuously flushed into the pressure box. The chilling of the chilled compressed air can be provided, for example, by a refrigeration and/or a throttling process. The chilled compressed air cools the laminated thermoplastic sheet in a rapid and controlled manner which is critical to preservation of finish and gloss of the class "A" side thereof. Alternatively, the chilled compressed air can be used throughout the forming and cooling processes.

Critical to the success of forming a class "A" part is the rate of cooling of the class "A" side of the laminated thermoplastic sheet. The class "A" side temperature needs to be reduced to less than 190 degrees F. within 30 seconds of initial forming of the sheet on the mold, more preferably within 20 seconds, and most preferably within 15 seconds. An infrared temperature sensor is used to indicate the class "A" side temperature of the laminated thermoplastic sheet.

Once the part is formed of the laminated thermoplastic sheet, the vacuum box and pressure box components are again separated, and the formed laminated thermoplastic sheet is removed, in a conventional manner from the mold. Next, the formed thermoplastic sheet is moved to a next station where it is removed, in a conventional manner, from the frame, put onto a cooling fixture, and then moved to a trimming station which trims it so as to provide a completed part.

Accordingly, it is an object of the present invention to eliminate the injection molding fabrication and painting process by providing a laminated thermoplastic thermoformed part having a class "A" finish and having a preserved gloss value above 70.

This and additional objects, features and advantages of the present invention will become clearer from the following specification of a preferred embodiment.

DESCRIPTION OF THE PREFERRED EMBODIMENT

Figure 2:
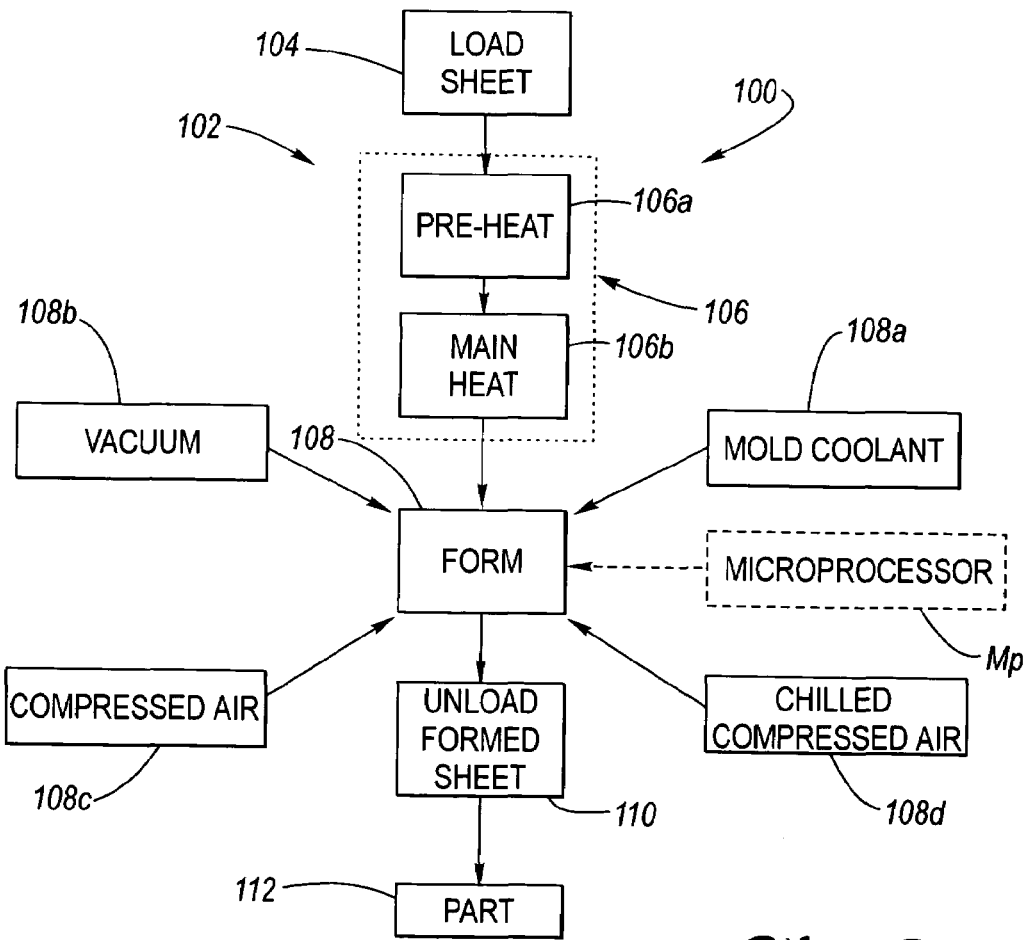
FIG. 2 is a flow chart of thermoforming steps according to the method of the present invention.

Referring now to the Drawing, FIGS. 2 through 4B depict various aspects of the thermoforming process 100 according to the present invention. In this regard, FIG. 2 depicts the thermoforming process 100 as a block flow chart 102, and FIGS. 3A through 4B depict schematic views of various steps of the flow chart of FIG. 2.

At Block 102 of the block flow chart 100, a laminated thermoplastic sheet 200 (see FIGS. 3A through 4B) is provided and loaded, in a conventional manner, onto a frame at a first station of a thermoformer apparatus, which may be, for example, configured for rotational loading, sled loading, or other form of loading.

The laminated thermoplastic sheet 200 may, for example, be of the type described hereinabove. By way merely of preference and not limitation, the thermoplastic carrier sheet of the laminated thermoplastic sheet 200 may have the following specifications: the composition is a thermoplastic olefin (TPO) material, having a stock thickness ranging between 40 and 400 thousandths of an inch, more preferably between 60 and 180 thousandths of an inch, and most preferably between 100 and 160 thousandths of an inch. Further by way merely of preference and not limitation, the paint film of the laminated thermoplastic sheet 200 may have the following specifications: the paint film is laminated to the thermoplastic carrier sheet, and consists of a PVDF/PMMA dispersion with color matched to specific vehicle paint; a mask is incorporated with composition primarily of polyurethane, commonly referred to as a "Version 14" or a "Version 8" available, for example through Soliant, LLC. of Lancaster SC 29720. Other paint films are usable.

At Block 106, the laminated thermoplastic sheet 200 is moved, via the frame, into one or more heating stations, preferably including (see FIGS. 3A and 3B) an optional pre-heating station 202 at Block 106a and a main heating station 204 at Block 106b, wherein the pre-heating station, when present, provides partial heating to the sheet in advance of the main heating station. Preferably, both the class "A" side A of the sheet and the opposite class "B" side B of the sheet are each heated by respective heater banks 206ap, 206bp, 206am, 206bm. The heaters of the heater banks may be, for example, quartz, calrod, ceramic and or halogen. The main heater station 204 heats the laminated thermoplastic sheet 200 into a moldably softened state so that is ready for being thermoformed.

If Block 106a is utilized, wherein pre-heating of the laminated thermoplastic sheet 200 is provided at the pre-heating station 202, then the sheet is heated thereat for between about 1 and 3 minutes to attain a sheet temperature of about 250 degrees F. Thereupon, the laminated thermoplastic sheet 200 is shuttled to the main heating station 204.

At Block 106b, the laminated thermoplastic sheet 200 is heated in the main heating station 204 preferably as follows. The class "B" side B of the sheet is spaced from heater bank 206bm a distance between preferably 7 inches and 24 inches and is heated to about 400 degrees Fahrenheit (degrees F.). The class "A" side A of the sheet is spaced from heater bank 206am a distance preferably between 12 inches and 32 inches. The laminated thermoplastic sheet 200 is heated for a period of time of preferably between 1 and 5 minutes or until the class "A" side A of the sheet attains a temperature ranging from between about 280 and 350 degrees F., more preferably between about 290 and 330 degrees F., and yet more preferably between about 300 and 315 degrees F. The heater bank temperature is controlled by an infrared sensor indicating the temperature of the class "A" side A of the sheet.

Figures 3A, 3B:
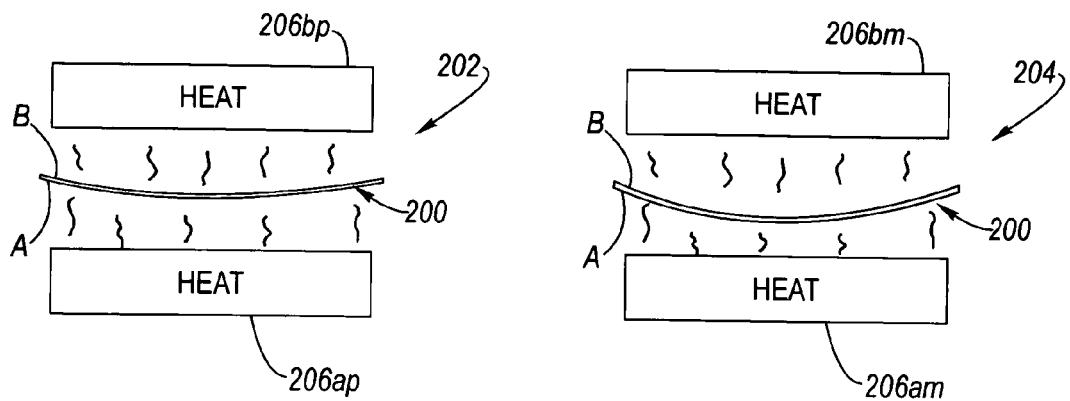
FIGS. 3A through 3G are schematic views depicting a series of sequential steps of the method of FIG. 2.
Figure 3C:
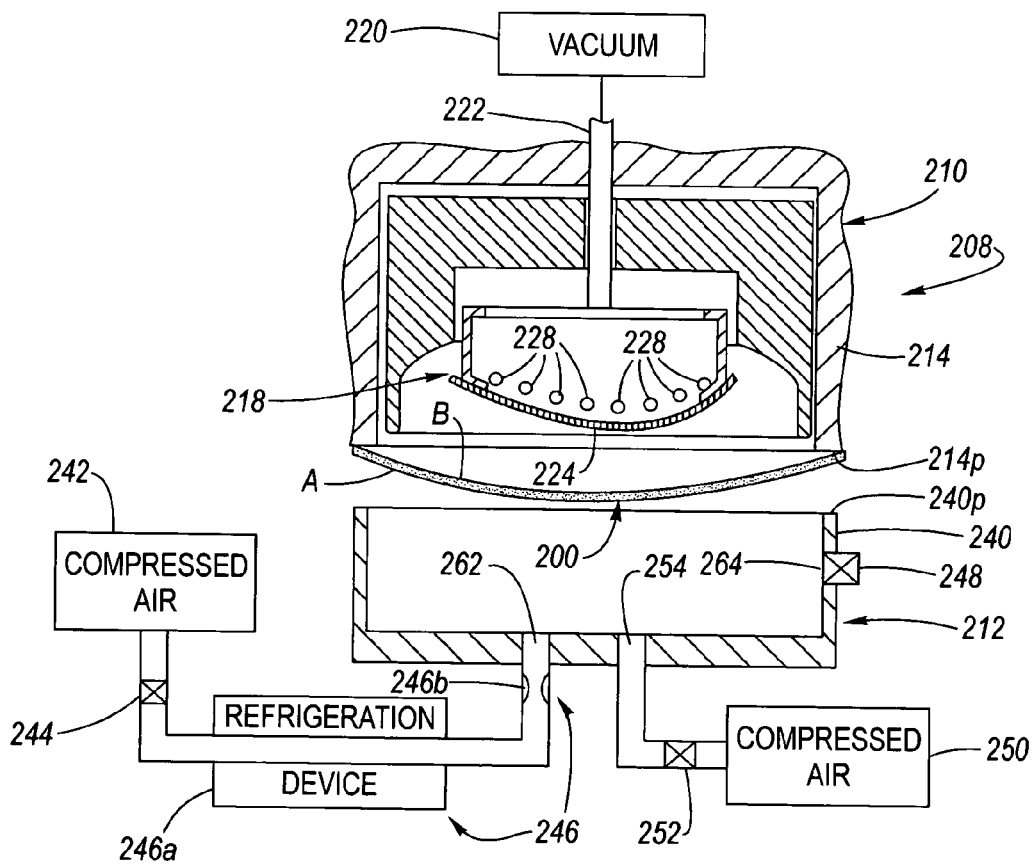

At Block 108 the heated laminated thermoplastic sheet 200 is delivered, via the frame, to a thermoformer 208 (see FIG. 3C). The thermoformer 208 has two components which are mutually separable and sealable: a vacuum box component 210 and a pressure box component 212. In this regard, the laminated thermoplastic sheet 200 is oriented such that the class "A" side A thereof faces toward the pressure box component 212, and the class "B" side B thereof faces toward the mold surface 224.

The vacuum box component 210 includes a vacuum box wall 214 which defines a vacuum box 230, a selectively movable inner support, a selectively movable mold 218, and a vacuum source 220 connected to the vacuum box via a vacuum conduit 222 which passes through the vacuum box wall. The mold 218 is, for example, composed of poured aluminum which is cut back to size, surface treated and sand blasted, and includes a mold surface 224 of a predetermined shape to which the laminated thermoplastic sheet 200 is to be formingly shaped. The mold further has a plurality of coolant lines 228 through which a liquid coolant flows, wherein the coolant lines may be in multiple zones, preferably between 2 and 4 zones, for cooling the mold surface. The vacuum source is preferably capable of providing a vacuum of at least 30 inches of mercury (inches of Hg).

The pressure box component 212 includes a pressure box wall 240 which defines a pressure box 260, a source of compressed air 242, an air valve 244, an air chiller 246, an air port 262 at the pressure box wall, an air pressure regulation valve 264, which may be incorporated with a dump valve 248, in the pressure box wall, and, preferably, an auxiliary source of compressed air 250, an auxiliary air valve 252 and an auxiliary air port 254 at the pressure box wall. The air chiller 246 cools the compressed air exiting from the source of compressed air 242, and may, for nonlimiting example, be a refrigeration device (as for example an air conditioning unit and/or a heat exchanger) 246a and/or a throttling valve 246b for cooling by the well-known Joule-Thomson effect in which rapid expansion of a gas produces cooling thereof. The dump valve 248 is preferably in the form of a 4 inch air actuated ball valve. The source of compressed air 242 and the auxiliary source of compressed air 250 are preferably capable of providing a high cubic foot per minute air flow at a pressure of at least 50 pounds per square inch above atmospheric pressure (psi). In this regard, the airflow rate of the chilled compressed air is sufficient to maintain a predetermined chilled temperature, discussed hereinbelow, within the pressure box.

Figure 3D:
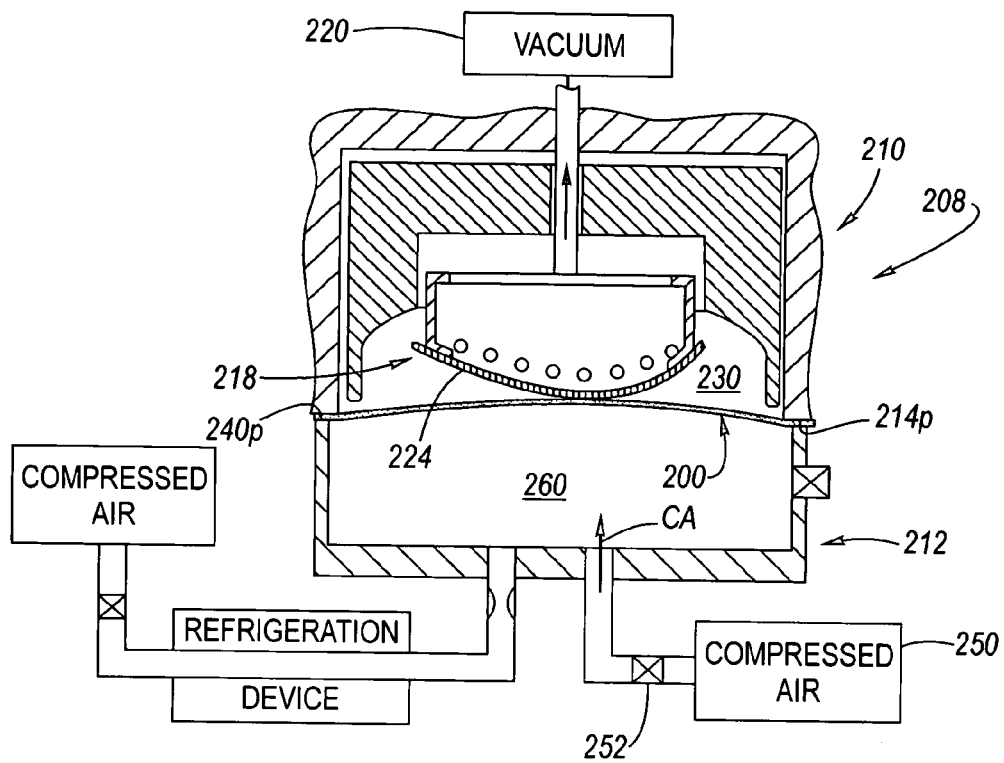
Figure 3E:
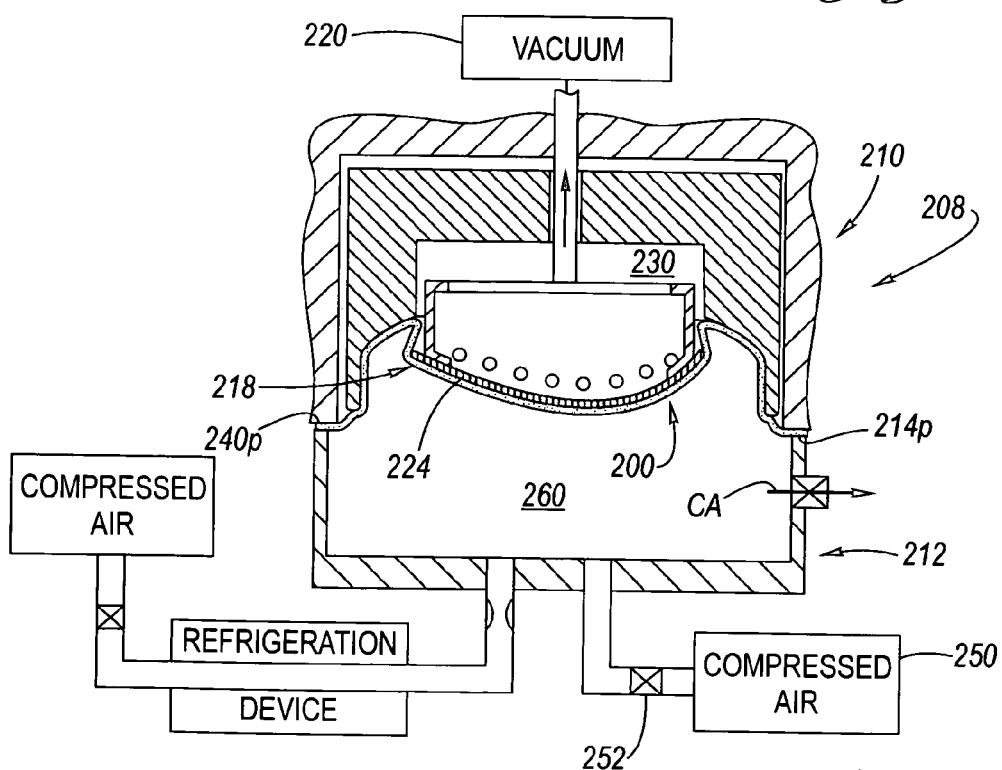
Figure 3F:
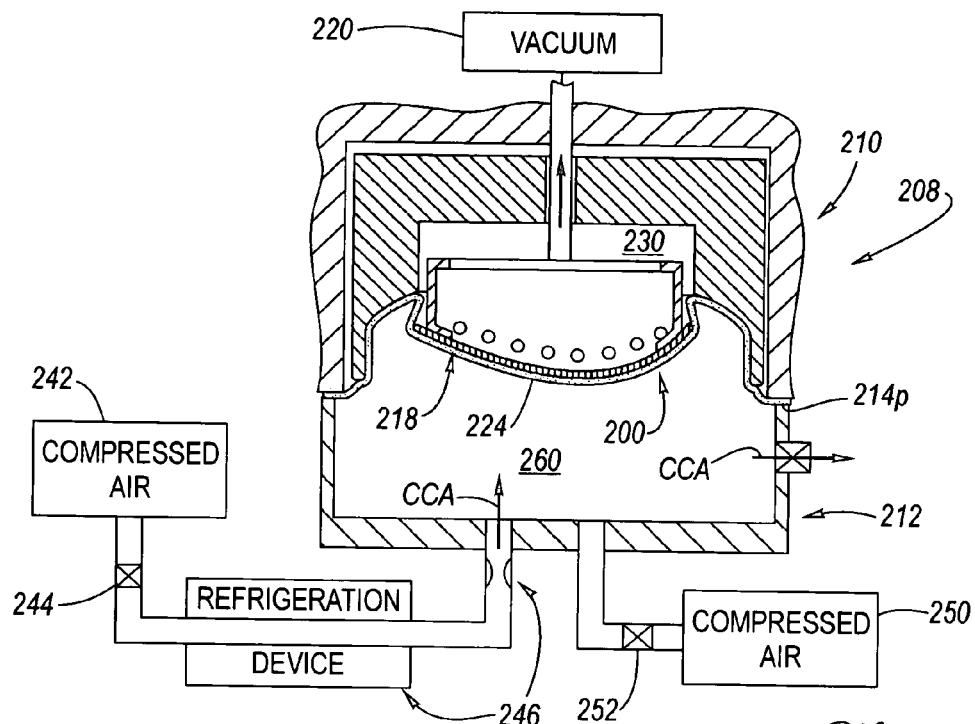
Figure 3G:
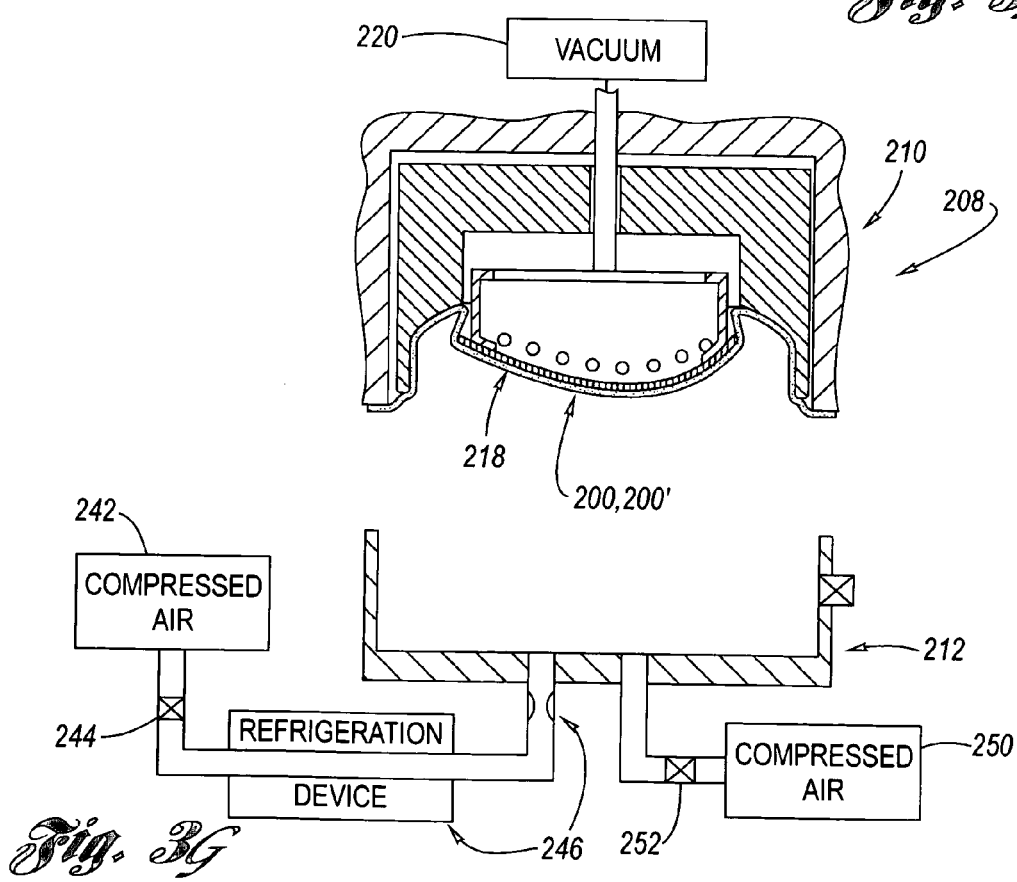

The vacuum box and pressure box components 210, 212 are movable toward and away from each other, preferably the vacuum box component being stationary, wherein when in a mutually separated state, as shown at FIGS. 3C and 3G, the laminated thermoplastic sheet is movable into and out of the thermoformer 208, and wherein when in a mutually closed state, the mutual perimeters 214p, 240p of the vacuum box wall 214 and the pressure box wall 240, respectively provide an air tight seal therebetween.

Operation of the aforementioned components is preferably controlled by a programmable microprocessor Mp, shown at FIG. 2.

Returning to Block 108, at FIG. 3D the vacuum box and pressure box components 210, 212 are bought together into the aforementioned closed state, whereat the perimeters 214p, 240p provide an air tight seal therebetween inclusive of the laminated thermoplastic sheet 200. With the laminated thermoplastic sheet 200 still in the aforementioned heated state provided by Block 106, thermoforming of the sheet is then performed at the thermoformer 208, as follows.

At Block 108a, cooling liquid (as for example water) is circulated through the coolant lines 228.

Next, at Block 108b, the vacuum source 220 is activated, drawing down a vacuum in the vacuum box 230 of from between zero and 30 inches of Hg, more preferably of between 10 and 25 inches of Hg, and most preferably of between 18 and 22 inches of Hg. As shown sequentially at FIGS. 3D and 3E, the vacuum causes the laminated thermoplastic sheet 200 to be sucked onto the mold surface 224 and thereupon assume the shape of the mold surface.

Simultaneously with execution of Block 108b, at Block 108c the auxiliary air valve 252 is opened and the auxiliary source of compressed air 250 thereupon delivers compressed air CA to the pressure box 260 of the pressure box component 212. The auxiliary source of compressed air 250 provides a rapid pressurization in the pressure box 260 of between zero to 40 psi, more preferably of between 5 and 30 psi, and yet more preferably between 10 and 25 psi. The pressure of the compressed air CA in the pressure box 260 is regulated by the pressure regulation valve 264, which may be incorporated in the air valve 244, in the auxiliary air valve 252, in the dump valve 248 (as mentioned and shown merely by way of example) or be a separate pressure regulation valve in the pressure box wall 240.

As shown sequentially at FIGS. 3D and 3E, the pressure of the compressed air CA pressing the laminated thermoplastic sheet 200 onto the mold surface 224 simultaneously acts with the sucking action of the vacuum source 220 drawing the laminated thermoplastic sheet onto the mold surface in Block 108b, to thereby enhance the forming detail of the laminated thermoplastic sheet with respect to surface details of the mold surface. The pressure of the compressed air CA at Block 108c is held in the pressure box 260 for between zero and 40 seconds, more preferably for between 5 and 30 seconds, and yet more preferably for between 7 and 15 seconds.

Once the aforesaid time of pressurization at Block 108c has expired, the auxiliary source of compressed air 250 is shut-off by the auxiliary air valve 252 being closed and the dump valve 248 being opened so as to dump the compressed air CA from the pressure box, as shown at FIG. 3E, to environs outside the thermoformer 208.

Next, at Block 108d, the dump valve 248 is closed and chilled compressed air CCA is introduced into the pressure box, via opening of the air valve 244, to allow, as shown at FIG. 3F, compressed air from the compressed air source to pass through the air chiller 246 flushingly into the pressure box 260. The pressure value of the chilled compressed air CCA is basically the same as that indicated hereinabove for the compressed air CA. The chilled compressed air CCA flushes at a flow rate into and out of the pressure box 260 so that, at maintained pressure, the temperature of the chilled compressed air in the pressure box is maintained at between 32 and 70 degrees F., more preferably between 32 and 60 degrees F., and yet more preferably between 32 and 50 degrees F.

The chilled compressed air CCA is applied for between 1 and 15 seconds, more preferably between 5 and 10 seconds, the time being determined by the desire to chill the class "A" side A of the laminated thermoplastic sheet 200 to a temperature of 200 degrees F., more preferably to below 190 degrees F., wherein an infrared temperature sensor senses the temperature of the class "A" side of the sheet, and the microprocessor controls the rate of temperature lowering of the sheet to ensure retention of gloss of the class "A" side thereof. In this regard, critical to the success of forming a class "A" part is the rate of cooling of the class "A" side (or surface) A of the laminated thermoplastic sheet 200. The class "A" side temperature needs to be reduced to less than 190 degrees F. within 30 seconds of initial forming on the mold, more preferably within 20 seconds and still more preferably within 15 seconds. Once forming of the laminated thermoplastic sheet is completed, the air valve 244 is closed.

At Block 110, the laminated thermoplastic sheet 200 has fully formed on the mold surface and has now become cooled, whereupon, as shown at FIG. 3G, the vacuum box and pressure box components 210, 212 are again separated, so that the formed laminated thermoplastic sheet 200' can be removed from the thermoformer 208.

Once the formed laminated thermoplastic sheet is removed from the thermoformer, it is moved to a next station where it is removed, in a conventional manner, from the frame, put onto a cooling fixture, and then moved to a trimming station which trims it to size to provide a completed part at Block 112.

Figure 4A:
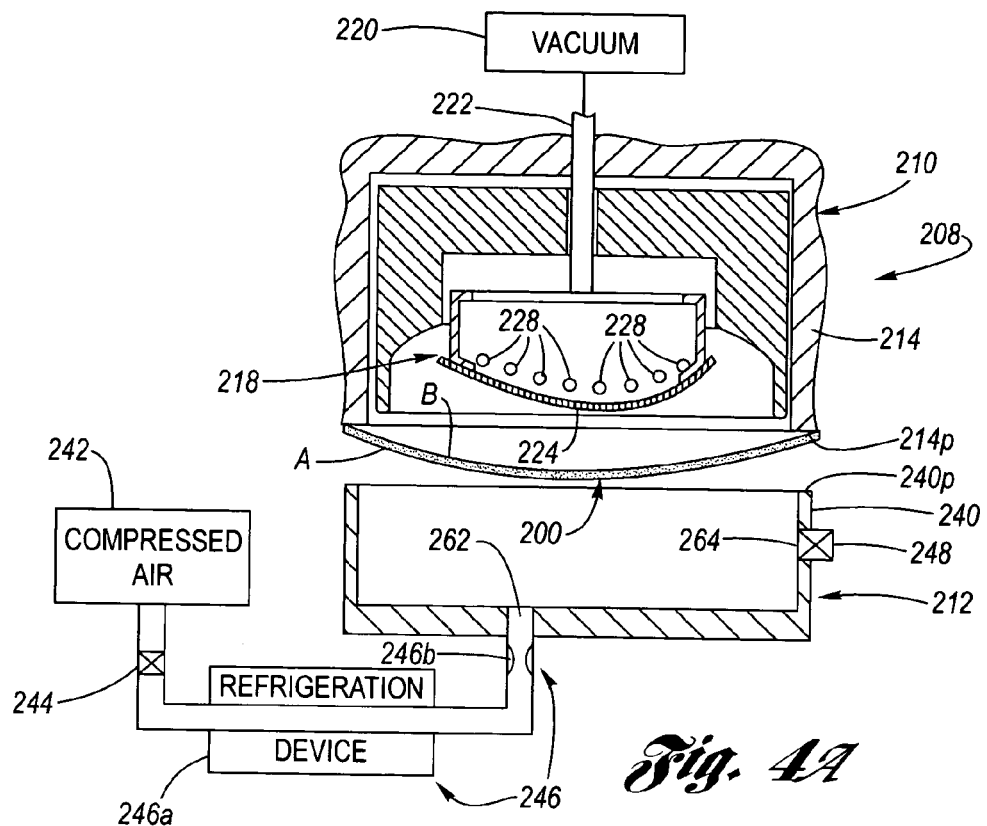
FIGS. 4A and 4B are schematic views depicting an alternative embodiment of the thermoformer of FIGS. 3C through 3G.
Figure 4B:
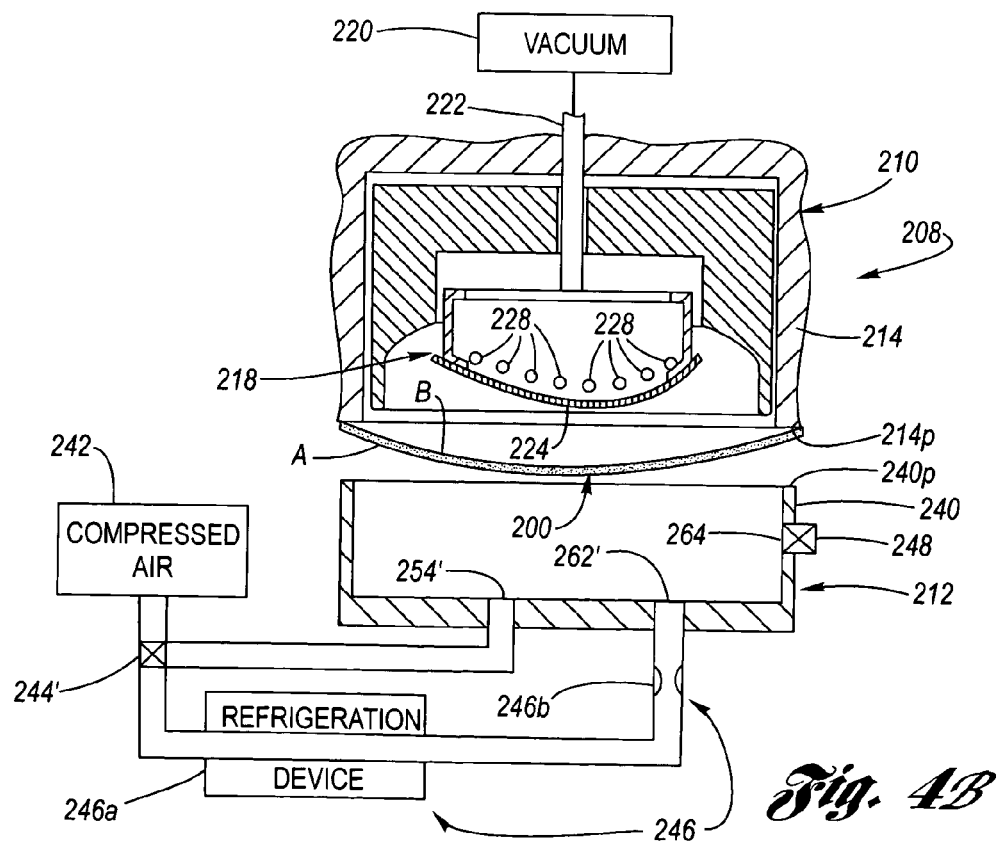

While the above described method of thermoforming involved an auxiliary source of compressed air 250, it is possible to alternatively use the source of compressed air 242 as a singular source of compressed air to the pressure box, as for example depicted at FIGS. 4A and 4B. In this regard, the air from the source of compressed air 242 may be chilled through the air chiller 246 initially as the singular source of compressed air 242 supplies at all times chilled compressed air to the pressure box 260, as shown at FIG. 4A (in this case, the compressed air comprises chilled compressed air). Alternatively in this regard, an initial shot of compressed air may be delivered as described hereinabove using only the source of compressed air 242, wherein a switch valve 244' directs the compressed air initially through an alternate conduit with a port 254', then after the laminated thermoplastic sheet has initially formed, the switch valve directs the compressed air through the refrigeration device 246 to provide the chilled compressed air at the portal 262' in the manner described hereinabove, as shown at FIG. 4B.

Utilizing the aforedescribed thermoforming process 100 according to the present invention, a laminated thermoplastic sheet can be thermoformed into a part with a retained gloss above 70 and distinctness of image (DOI) greater than 80, the requirement for class "A" parts for automotive industry.

Figure 1:
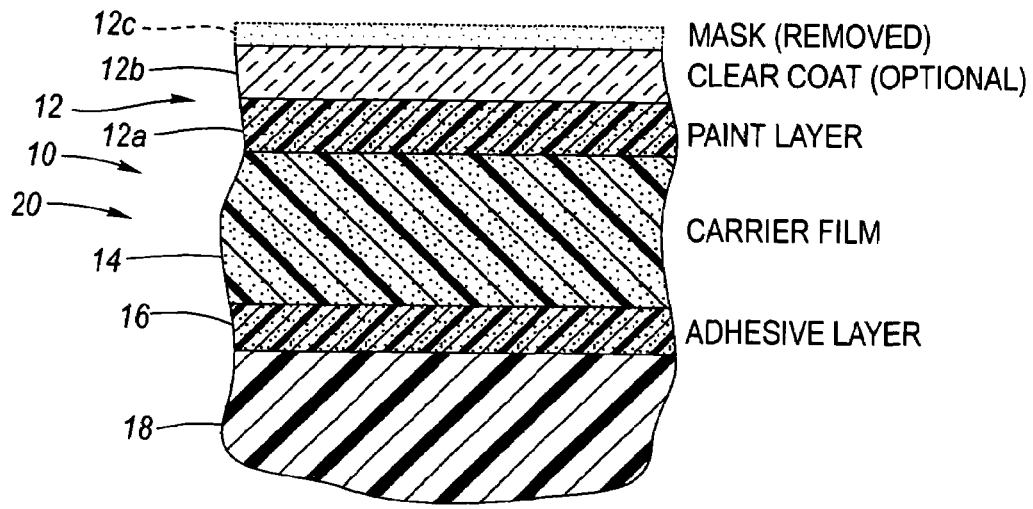
FIG. 1 is a broken-away, sectional side view of a prior art thermoformed part, the part being conventionally thermoformed from a conventional laminated thermoplastic sheet.

The following examples were performed and are provided for illustrative purposes. Gloss was measured using a BYK-Gardner (of Columbia, Md. 21046) micro tri-gloss meter model 4524 at a 60 degrees surface angle. In each example, the laminated thermoplastic sheet was a TPO sheet having a composition similar to that shown in FIG. 1, and having a total thickness of about 140 thousandths of an inch.

EXAMPLE 1

| PROCESSING CONDITIONS: | VALUES: |
|---|---|
| Class "A" side temp. | 330 degrees F. |
| Class "B" side temp. | 430 degrees F. |
| Compressed air temp. | Not applicable |
| Chilled compressed air temp. | Not applicable |
| Air pressure in pressure box | None |
| Vacuum | 20 inches of Hg |
| Vacuum time | about 60 seconds |
| Mold coolant temp. | 75 to 90 degrees F. |
| 60° gloss reading before molding | at or above 70 |
| 60° gloss reading after molding | 50 |
| Mold cooling temperature | 75 to 90 degrees F. |
| Quality of part, comments | Webbing, poor quality, lost gloss |

Example 1 illustrates prior art thermoforming process conditions, wherein the hoped for outcome should a high gloss class "A" part; however, poor part quality and low gloss resulted. There was no compressed air in the pressure box.

EXAMPLE 2

| PROCESSING CONDITIONS: | VALUES: |
|---|---|
| Class "A" side temp. | 320 degrees F. |
| Class "B" side temp. | 420 degrees F. |
| Compressed air temp. | about 90 degrees F. |
| Chilled compressed air temp. | Not applicable |
| Air pressure in pressure box | 20 psi |
| Compressed air time | about 60 seconds |
| Vacuum | 20 inches of Hg |
| Vacuum time | about 60 seconds |
| Mold coolant temp. | 75 to 90 degrees F. |
| 60° gloss reading before molding | at or above 70 |
| 60° gloss reading after molding | 50 |
| Mold cooling temperature | 75 to 90 degrees F. |
| Quality of part, comments | poor forming, lost gloss |

Example 2 illustrates a second example of the prior art which is an adjustment of the process illustrated in Example 1, wherein ambient temperature compressed air was introduced into the pressure box. Although temperatures were lowered, the results were as in Example 1, poor part quality and low gloss.

EXAMPLE 3

| PROCESSING CONDITIONS: | VALUES: |
|---|---|
| Class "A" side temp. | 310 degrees F. |
| Class "B" side temp. | 400 degrees F. |
| Compressed air temp. | about 90 degrees F. |
| Chilled compressed air temp. | 70 degrees F. |
| Air pressure in pressure box | 20 psi |
| Compressed air time | 7 to 12 seconds |
| Chilled compressed air time | 53 to 48 seconds |
| Vacuum | 20 inches of Hg |
| Vacuum time | about 60 seconds |
| Mold coolant temp. | 75 to 90 degrees F. |
| 60° gloss reading before molding | at or above 70 |
| 60° gloss reading after molding | 60 |
| Mold cooling temperature | 75 to 90 degrees F. |
| Quality of part, comments | good forming, lost gloss |

In Example 3, by adding some chilled compressed air into the pressure box, the definition of the formed part was improved, but the gloss was still inferior.

EXAMPLE 4

| PROCESSING CONDITIONS: | VALUES: |
|---|---|
| Class "A" side temp. | 310 degrees F. |
| Class "B" side temp. | 400 degrees F. |
| Compressed air temp. | about 90 degrees F. |
| Chilled compressed air temp. | 50 degrees F. |
| Air pressure in pressure box | 20 psi |
| Compressed air time | 7 to 12 seconds |
| Chilled compressed air time | 53 to 48 seconds |
| Vacuum | 20 inches of Hg |
| Vacuum time | about 60 seconds |
| Mold coolant temp. | 75 to 90 degrees F. |
| 60° gloss reading before molding | at or above 70 |
| 60° gloss reading after molding | at or above 70 |
| Mold cooling temperature | 75 to 90 degrees F. |
| Quality of part, comments | good forming, retained gloss |

Example 4 was carried out according to the thermoforming method 100 of the present invention, as outlined hereinabove. The forming detail and retention of gloss of the class "A" side was excellent.

EXAMPLE 5

The process as described above in Example 4 was followed, but the class "A" side of the laminated thermoplastic sheet was cooled such that the class "A" side did not reach 190 degrees F. within 15 seconds. By not switching to chilled air for greater than 15 seconds, the gloss of the part was reduced to less than a value of 70. This illustrates the importance of cooling the class "A" side of the laminated thermoplastic sheet below 190 degrees F. within 15 seconds. Not achieving this timing causes the gloss of the class "A" side to fall below 70.

By contrast, the process as described in Example 4 involved the chilled compressed air being introduced in less than 7 to 12 seconds into the pressure box, resulting a gloss value being retained above 70. Accordingly, it is anticipated that incorporating the chilled compressed air initially at the pressurization stage will further enhance or sustain the final gloss of the class "A" side of the laminated thermoplastic sheet.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method of thermoforming a laminated thermoplastic sheet, comprising the steps of:
   a) heating the laminated thermoplastic sheet, wherein the laminated thermoplastic sheet has a first side and an opposite second side, wherein the first side comprises a class "A" paint film having an initial gloss;
   b) placing the heated laminated thermoplastic sheet into a thermoformer, wherein the thermoformer has a mold surface and wherein the second side of the laminated thermoplastic film faces toward the mold surface;
   c) cooling the mold surface;
   d) applying vacuum to the thermoformer, wherein the vacuum acts suckingly upon the second side of the laminated thermoplastic sheet; and
   e) applying chilled compressed air having a temperature less than 70 degrees F. to the thermoformer during the step d), wherein the chilled compressed air acts pressurably upon the first side of the laminated thermoplastic sheet;
   wherein the vacuum and the chilled compressed air act on the laminated thermoplastic sheet to cause the laminated thermoplastic sheet to conform to a shape of the mold surface; and
   wherein the chilled compressed air causes the laminated thermoplastic sheet to cool at a rate which preserves the initial gloss of the class "A" paint film.

2. The method of claim 1, wherein the vacuum is substantially between 10 and 22 inches of mercury.

3. The method of claim 1, wherein the chilled compressed air is at a temperature of substantially between 32 and 60 degrees Fahrenheit.

4. The method of claim 1, wherein the vacuum is applied for substantially between 5 and 60 seconds, and wherein the chilled pressurized air is applied for substantially between 5 and 40 seconds.

5. The method of claim 1, wherein the step a) provides the first side of the laminated thermoplastic sheet with a temperature of substantially between 280 and 350 degrees F.; and wherein during the steps c), d) and e), the laminated thermoplastic film cools to a temperature of 190 degrees F. in between 15 and 30 seconds.

6. The method of claim 1, wherein:
   the vacuum is substantially between 10 and 22 inches of mercury;
   the chilled compressed air is at a temperature of substantially between 32 and 60 degrees Fahrenheit;
   the vacuum is applied for substantially between 5 and 60 seconds;
   the compressed air is applied for less than substantially 12 seconds; and
   the chilled compressed air is applied for substantially between 5 and 40 seconds.

7. The method of claim 6, wherein the step a) provides the first side of the laminated thermoplastic sheet with an initial temperature of substantially between 280 and 350 degrees F.; and wherein during the steps c), d) and e), the laminated thermoplastic film cools to a temperature of 190 degrees F. in between 15 and 30 seconds.

8. A method of thermoforming a laminated thermoplastic sheet, comprising the steps of:
   a) heating the laminated thermoplastic sheet, wherein the laminated thermoplastic sheet has a first side and an opposite second side, wherein the first side comprises a class "A" paint film having an initial gloss;
   b) placing the heated laminated thermoplastic sheet into a thermoformer, wherein the thermoformer has a mold surface and wherein the second side of the laminated thermoplastic film faces toward the mold surface;
   c) cooling the mold surface;
   d) applying vacuum to the thermoformer, wherein the vacuum acts suckingly upon the second side of the laminated thermoplastic sheet;
   e) applying compressed air to the thermoformer substantially simultaneously with the step d), wherein the compressed air acts pressurably upon the first side of the laminated thermoplastic sheet; and
   f) applying chilled compressed air having a temperature less than 70 degrees F. to the thermoformer after the step e) and during the step d), wherein the chilled compressed air acts pressurably upon the first side of the laminated thermoplastic sheet;
   wherein the vacuum, the compressed air and the chilled compressed air act on the laminated thermoplastic sheet to cause the laminated thermoplastic sheet to conform to a shape of the mold surface; and
   wherein the chilled compressed air causes the laminated thermoplastic sheet to cool at a rate which preserves the initial gloss of the class "A" paint film.

9. The method of claim 8, wherein the vacuum is substantially between 10 and 22 inches of mercury.

10. The method of claim 8, wherein the chilled compressed air is at a temperature of substantially between 32 and 60 degrees Fahrenheit.

11. The method of claim 8, wherein the vacuum is applied for substantially between 5 and 60 seconds, and wherein the pressurized air is applied for less than substantially 12 seconds, and wherein the chilled compressed air is applied for substantially between 5 and 40 seconds.

12. The method of claim 8, wherein the compressed air comprises the chilled compressed air.

13. The method of claim 8, wherein the step a) provides the first side of the laminated thermoplastic sheet with an initial temperature of substantially between 280 and 350 degrees F.; and wherein during the steps c) through f), the laminated thermoplastic film cools to a temperature of 190 degrees F. in between 15 and 30 seconds.

14. The method of claim 13, wherein:

the vacuum is substantially between 10 and 22 inches of mercury;

the chilled compressed air is at a temperature of substantially between 32 and 60 degrees Fahrenheit;

the vacuum is applied for substantially between 5 and 60 seconds;

the compressed air is applied for less than substantially 12 seconds; and the chilled compressed air is applied for substantially between 5 and 40 seconds.

15. The method of claim 14, wherein the compressed air comprises the chilled compressed air.

* * * * *